(12) United States Patent
McCall et al.

(10) Patent No.: US 7,327,215 B2
(45) Date of Patent: *Feb. 5, 2008

(54) KEYLESS ENTRY WITH HIDDEN KEYPAD

(75) Inventors: Clark E. McCall, Ann Arbor, MI (US); Fred W. Huntzicker, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 434 days.

This patent is subject to a terminal disclaimer.

(21) Appl. No.: 11/017,267

(22) Filed: Dec. 20, 2004

(65) Prior Publication Data

US 2006/0132282 A1 Jun. 22, 2006

(51) Int. Cl.
*H04Q 9/00* (2006.01)
*B60R 25/10* (2006.01)
*B60R 1/02* (2006.01)
*B60R 25/04* (2006.01)

(52) U.S. Cl. .................. 340/5.2; 340/5.72; 340/5.54; 340/5.51; 340/5.6; 340/425.5; 340/426.12; 340/426.27; 248/479; 307/10.4; 341/33

(58) Field of Classification Search .............. 340/5.72, 340/5.2, 5.54, 5.51, 5.6, 425.5, 426.12, 426.27; 248/479; 307/10.4; 341/33
See application file for complete search history.

(56) References Cited

U.S. PATENT DOCUMENTS

| 5,574,425 A | * | 11/1996 | Shu ................... 340/426.12 |
| 2004/0104812 A1 | * | 6/2004 | Mayor ................. 340/425.5 |
| 2005/0190040 A1 | * | 9/2005 | Huntzicker et al. ..... 340/5.54 |

* cited by examiner

*Primary Examiner*—Jeffery Hofsass
*Assistant Examiner*—Scott Au

(57) ABSTRACT

A keypad assembly for use on a vehicular keyless entry system comprises a selectively concealable keypad coupled to a processor and accessible from the exterior of the vehicle and through which an access code may be manually entered. A mirror assembly is mounted on an exterior surface of the vehicle and includes a base fixedly coupled to the exterior surface and a mirror compartment rotatably coupled to the base and capable of being rotated between an extended, operational position and a folded, retracted position. The keypad is mounted on the base so as to be visible and accessible when the mirror compartment is in its folded retracted position and hidden and inaccessible when the mirror compartment is in it's extended, operational position.

20 Claims, 4 Drawing Sheets

KEYLESS ENTRY WITH HIDDEN KEYPAD

FIELD OF THE INVENTION

The invention relates generally to keyless entry systems, and more particularly, to a keyless entry system for gaining access to a vehicle and employing a keypad mounted on the exterior of the vehicle in such a way that it may be selectively hidden from view.

BACKGROUND OF THE INVENTION

Many vehicles (i.e. automobiles, trucks, sport utility vehicles, etc.) are equipped with keyless entry systems that may include a portable fob having controls thereon that enable the user to unlock the vehicle's doors and perform other functions through encoded RF signals transmitted to a receiver located on the vehicle. Depending on the system, the user may also activate and deactivate alarms, turn lights on and off, and in some cases start the vehicle.

Certain of these vehicles, luxury cars in particular, may be equipped with door-mounted keyless entry systems. Such systems typically utilize a keypad positioned proximate a vehicle's door handle, thus enabling an authorized user to key in a numeric or alphanumeric code, and if the code is correct, the door or doors are automatically unlocked allowing the user to enter the vehicle. Inputting the correct code may also turn interior lights on, enable the ignition system, etc.

While such keypads are generally low in profile, certain shortcomings have been noted. For example, the fact that such keypads are typically positioned on the exterior door panel of a vehicle proximate the door handle, they are clearly visible and aesthetically displeasing to some. Furthermore, such keypads are accessible to unauthorized individuals and are therefore subject to being tampered with. In addition, such exteriorly mounted keyboards are exposed to the elements (i.e. dirt, rain, sunlight, etc.) that, over a period of time, may damage the keypad or otherwise reduce its operational life.

It would therefore be desirable to provide a keyless entry system utilizing a keypad that is accessible from a vehicle's exterior but is automatically hidden from view and/or rendered inaccessible during certain modes of vehicle operation. For example, the keypad may be rendered inaccessible (out of sight) when the vehicle is being driven and made visible and accessible when an operator needs to use it; e.g. as when the vehicle is parked and the operator desires entry. It would further be desirable that the keypad be capable of being selectively hidden and/or rendered inaccessible by an operator of the vehicle from either the vehicle's interior or exterior.

BRIEF SUMMARY OF THE INVENTION

According to an aspect of the invention there is provided a keyless entry system for use on a vehicle, the system comprising an onboard processor for receiving an access code and comparing the access code with a stored code, and a selectively concealable keypad coupled to the processor and accessible from the exterior of the vehicle through which the access code may be entered.

According to a further aspect of the invention there is provided a keypad assembly for use on a vehicle. A mirror assembly is mounted on an exterior surface of the vehicle and comprises a base fixedly coupled to the exterior surface, and a mirror compartment rotatably coupled to the base and capable of being rotated between an extended, operational position and a folded, retracted position. The keypad is mounted on the base and is visible and accessible when the mirror compartment is in its folded, retracted position, and the keypad is hidden and inaccessible when the mirror compartment is in its extended, operational position.

According to a still further aspect of the invention, there is provided a keyless entry system for use on a vehicle. An onboard processor receives an access code and compares the access code to a stored code. A selectively concealable keypad is coupled to the processor and is accessible from the exterior of the vehicle through which the access code may be manually entered. A mirror assembly is mounted on an exterior surface of the vehicle and comprises a base fixedly coupled to the exterior surface and a mirror compartment rotatably coupled to the base and capable of being rotated between an operational position and a retracted position. The keypad is mounted on the base so as to be hidden and inaccessible when the mirror compartment is in the operational state and visible and accessible when the mirror compartment is in the retracted position.

DETAILED DESCRIPTION OF THE INVENTION

Figure 1:
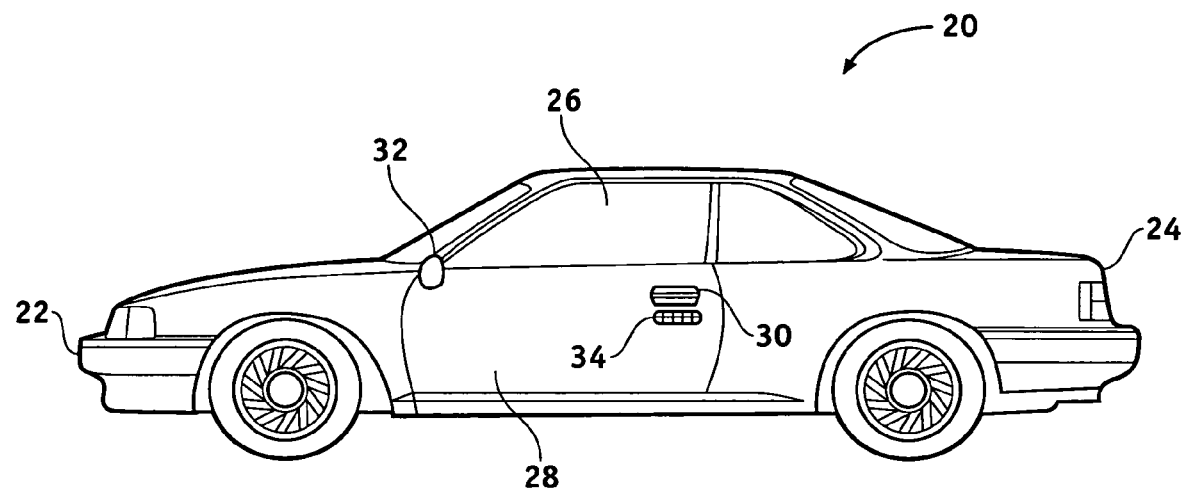
FIG. 1 is a side view of a vehicle having a keypad exteriorly mounted proximate the vehicle's door-handle as is typical with known keyless entry systems.

FIG. 1 is a side view of a vehicle having a keypad exteriorly mounted proximate the vehicle's door handle as is typical with known keyless entry systems. As can be seen from FIG. 1, a vehicle 20 is shown having a front end 22, a rear end 24, a passenger compartment 26, a driver's side door 28, a door handle 30, a rear view mirror 32, and a keypad 34 mounted on an exterior panel of the vehicle; e.g. on the exterior of door 28 proximate door handle 30. As described previously, keypad 34 operates in conjunction with a keyless entry system to enable an individual to manually enter a code to gain access to the vehicle. Keyboard 34 may be numeric or alphanumeric.

Figure 2:
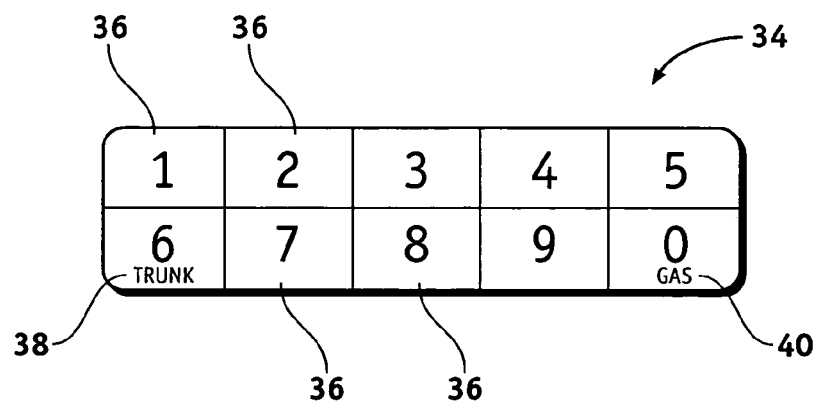
FIG. 2 is a plan view of a keypad suitable for use on the vehicle shown in FIG. 1.

FIG. 2 is a plan view of a keyless entry keypad suitable for use on vehicle 20. Referring to FIG. 2, keypad 34 includes a plurality of individual keys 36 each of which having provided thereon numerical designations and one or more of which may contain functional designations as is shown at 38. While numeric designations have been utilized in the keypad shown in FIG. 2, it should be appreciated that other designations (e.g. alphabetic) may be utilized. Furthermore, while FIG. 2 illustrates keys having a generally square or rectangular configuration, they may take any appropriate geometric shape. In operation, a user may perform a function such as tapping on a specific region (e.g. a window) to power up at least the electronics associate with the keypad and its inputs, perhaps lighting the keypad if desired. A user may gain entry to the vehicle by simply keying the appropriate code in a proper sequence via keypad 34. Access to the vehicle's trunk or gasoline tank may be achieved by entering an appropriate code and then pressing key 38 or 40 respectively.

Figure 3:
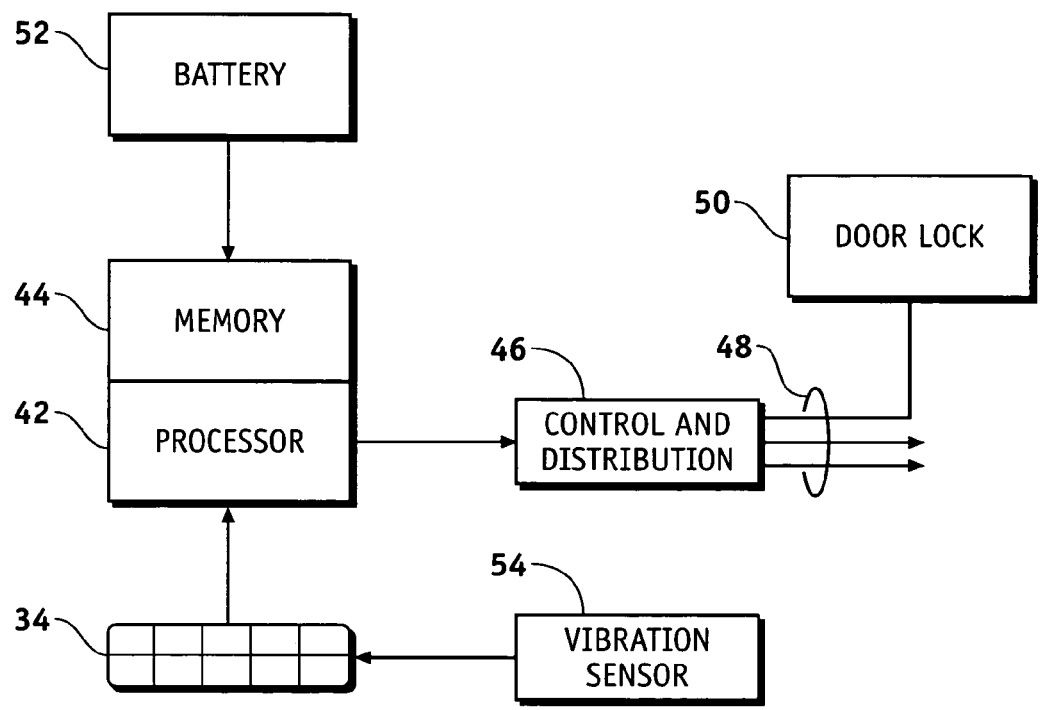
FIG. 3 is a block diagram illustrating the major components of a keyless entry system.

FIG. 3 is a block diagram of the major components of a keyless entry system. As can be seen, keypad 34 communicates with processor 42 having memory 44 associated therewith; preferably of the nonvolatile type. Processor 42 is coupled to control and distribution unit 46. Control and distribution unit 46 provides an output along one of lines 48 to door lock 50. Control and distribution unit 48 may also provide outputs for controlling lights, activating or deactivating security functions, starting the engine, starting the heater, and the like. Processor 42 and memory 44 may be of the conventional type and comprise well known microprocessor/memory configurations.

The system shown in FIG. 3 is preferably battery operated. To save power, a vibration sensor 54 may be provided for powering up keypad 34 when it senses vibrations due to, for example, a tapping on a vehicle window. Battery power may also be preserved by providing a shut-down mode that is automatically entered after a preset number of incorrect attempts to enter the correct code via keypad 34.

The operation of the keyless entry system shown in FIG. 3 is well known. To gain access to a vehicle, an operator enters a code via keypad 34. That code is transmitted to processor 42 where it is compared with a correct code stored in memory 44. If the entered code and the stored code match, an appropriate signal is sent to control and distribution unit 46 which in turn will unlock door lock 50 thus enabling the operator to enter the vehicle and/or enabling other functions as described above.

Rearview/sideview mirrors are positioned on a vehicle to give an operator of the vehicle a view to the sides of and behind the vehicle. Exterior rearview/sideview mirrors extend from the side of the vehicle and generally include a mirror housing mounted on a base or appliqué on the vehicle. The base or appliqué is generally a low profile component fixedly mounted on the vehicle. The mirror housing contains a mirror and its adjustment mechanism.

Such mirrors on sport-utility vehicles and other large vehicles often extend a relatively large distance from the side of the vehicle. This may present difficulties when maneuvering the vehicle through such places as the service window of a bank, the drive-through of a restaurant, and the like. To minimize this problem, folding mirrors are provided. Some such mirrors must be operated manually; however, power folding mirrors are available and facilitate retracting the mirrors.

Figure 4:
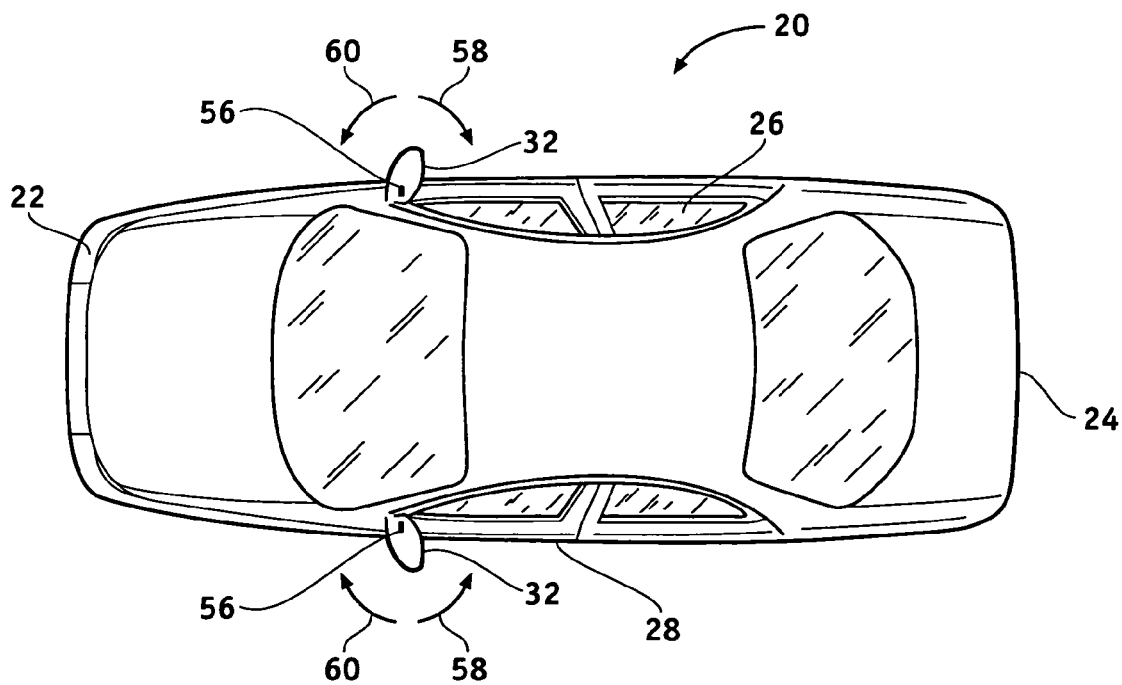
FIG. 4 is a top view of the vehicle shown in FIG. 1.

FIG. 4 is a top view of the vehicle shown in FIG. 1, and like elements have been denoted with like reference numerals. Mirrors 32 comprise power folding sideview/rearview mirror assemblies. Each mirror 32 folds with respect to vehicle 20 about an axis 56 in a direction rearward of vehicle 10 as is shown by arrows 58. When folded, the distance to which each mirror assembly 32 extends from vehicle 20 is substantially reduced. Mirror assemblies 32 may also break away in the forward direction as is shown by arrows 60.

Figure 5:
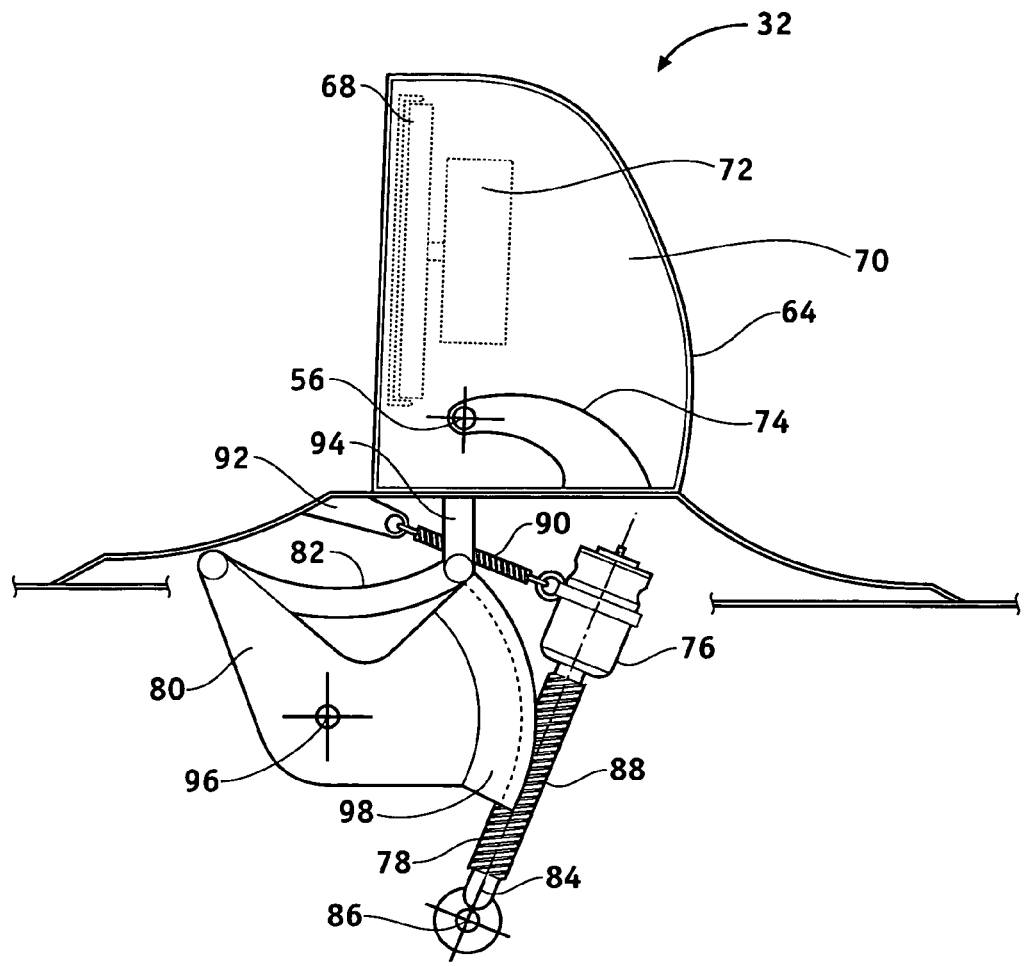
FIG. 5 is a partial cutaway top view of a known power folding mirror assembly in an unfolded configuration.

As stated previously, mirror assembly 32 is foldable between an operable position when the rearview mirror extends outwardly from the side of the vehicle, and a folded position when the rearview mirror is folded alongside the vehicle. In addition, the mirrors may have a breakaway feature which allows them to move forward or rearward if impacted. FIG. 5 is a partial cutaway top view of a known power folding mirror assembly in an unfolded configuration. Mirror assembly 32 includes a base or appliqué 62, a mirror housing 64, and a mirror 68. Base 62 and housing 64 may be made of any suitable material such as a polymeric material. Base 62 is preferably fixed to door 28 of vehicle 20, and housing 64 moves with respect to base 62 during folding and unfolding.

Mirror housing 64 includes a cavity 70 therein that encloses an electrical mirror actuator 72 that is coupled to mirror 68. Electric mirror actuator 72 is used to position mirror 68 with respect to housing 64. Housing 64 is pivotable about axis 56, and pivot arm 74 extends into cavity 70. A motor 76 is coupled to a coupling mechanism 78 which is caused to rotate by motor 76 thereby causing housing 64 to move with respect to base 62. Coupling mechanism 78 may include a pivot gear 80 and a link 82.

Motor 76 is mounted within vehicle 20 and has an output shaft 84 mounted at shaft mount 86 to vehicle 20. Shaft mount 86 permits output shaft 84 to rotate. Output shaft 84 includes a gear 88 (e.g. pinion gear) either coupled thereto or integrally formed therewith. Motor 76 is preferably coupled to base 62 by means of spring mount 92. In this manner, motor 76 and output shaft 84 may move relative to coupling mechanism 78. Shaft mount 86 permits output shaft 84 to pivot along an axis that is generally transverse to the rotational axis of gear 88.

Coupling mechanism 78 includes pivot gear 80 that is mounted in the door and connected to link 82. Link 82 is connected to housing arm 94 which is pivotally fixed with respect to housing 64 and extends from housing 64. Pivot gear 80 pivots about an axis 96, and one end of pivot gear 80 includes a segment gear 98 which is shaped like an arc. Segment gear 98 engages gear 88 of output shaft 84. As output shaft 84 rotates, different points along the arc of segment gear 98 contact gear 88. The arc of segment gear 98 is preferably centered around pivot gear axis 96 so that as segment gear 98 moves pivot gear 80 rotates about pivot gear access 96. As pivot gear 80 rotates, link 82 moves housing arm 94 so that mirror housing 64 pivots about axis 56.

Power folding mirrors are well known in the art and further discussion is not deemed necessary. However, the interested reader is directed to U.S. Pat. No. 5,940,230 issued Aug. 17, 1999 and entitled "POWER FOLDING REAR VIEW MIRROR ASSEMBLY FOR AN AUTOMOTIVE VEHICLE" and U.S. Pat. No. 6,243,218B1 issued Jun. 5, 2001 and entitled "MIRROR ACTUATOR". Likewise, keyless entry systems of a type which employ a keypad mounted on the exterior of a vehicle are well known in the art. For a further discussion, the interested reader is directed to U.S. Pat. No. 6,617,975B1 issued Sep. 9, 2003 and U.S. Pat. No. 6,606,492B1 issued Aug. 12, 2003 and entitled "KEYLESS ENTRY SYSTEM".

Figure 6:
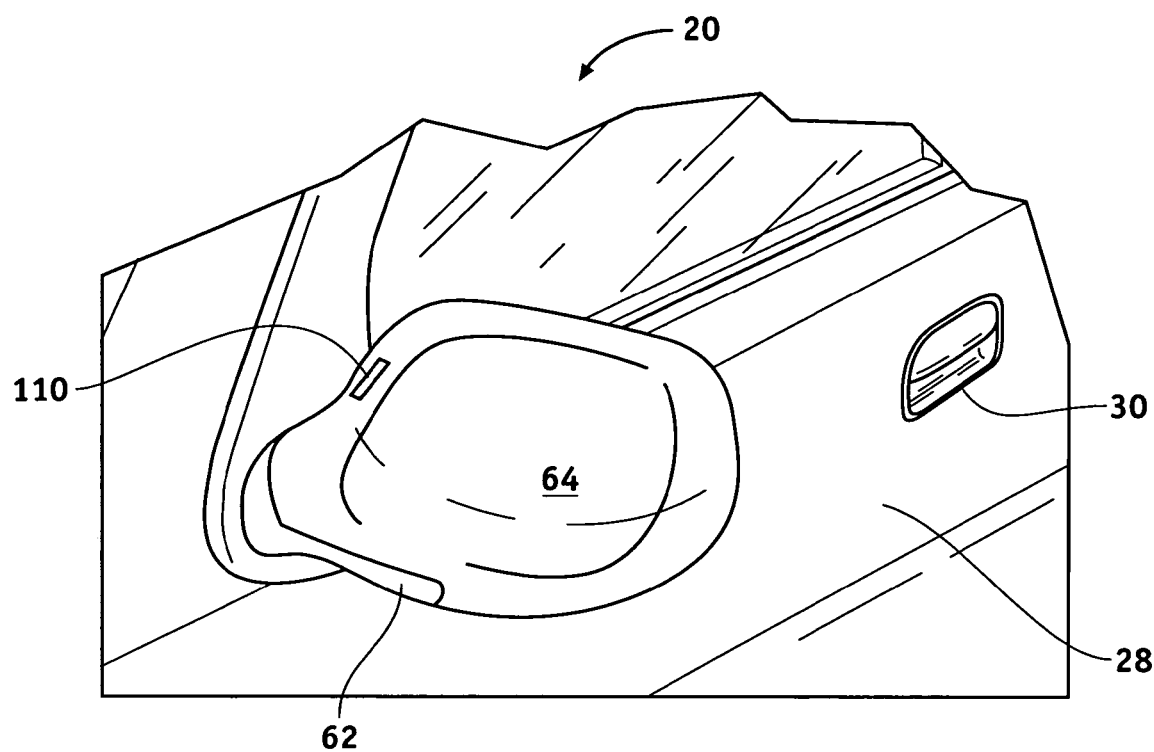
FIG. 6 is an isometric view of a power-foldable mirror assembly in its operational (i.e. unfolded) configuration.
Figure 7:
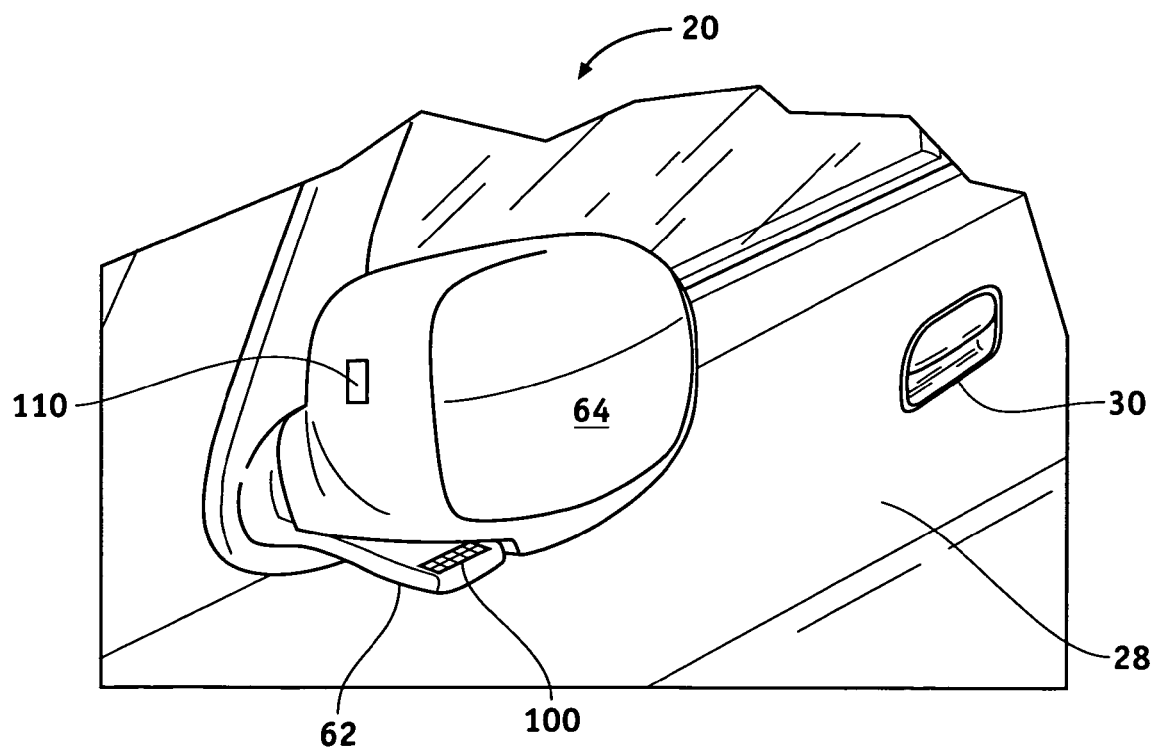
FIG. 7 is an isometric view of the mirror assembly shown in FIG. 5 in its retracted (i.e. folded) configuration in accordance with the present invention.

As stated previously, it would be desirable to provide a keypad entry system wherein the keypad is located on a region of the exterior of the vehicle that may be concealed to improve the appearance of the vehicle, prevent unauthorized tampering, and reduce exposure to the elements. One such location may be on or within the base of a foldable rear view mirror such that the keyboard is only visible and accessible when the mirror is in its folded or retractable position. FIG. 6 and FIG. 7 are isometric views of a power foldable mirror assembly in its operational (i.e. unfolded) configuration and in its retracted (i.e. folded) configuration in accordance with the present invention. Referring first to FIG. 7, a keypad 100 is mounted on base 62 and is visible when mirror housing 64 is retracted. As can be seen, when mirror 64 is in its unfolded position (FIG. 6) keyboard 100 is not visible and therefore not accessible.

Figure 8:
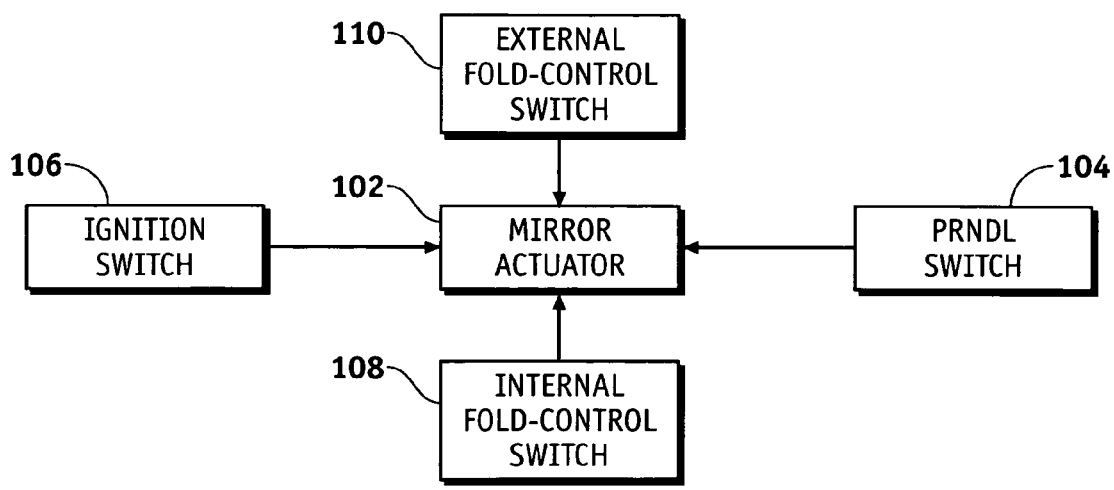
FIG. 8 is a block diagram of an apparatus for controlling the folding and unfolding of a power folding mirror.

Also, as stated previously, it would be desirable that the mirror be folded or retracted when the vehicle is in a predetermined state of operation and that the mirror be foldable at the discretion of the operator. Referring to FIG. 8 which is a block diagram of an apparatus for achieving the desired operation, mirror actuator 102 which performs the near folding and unfolding functions is coupled to the vehicles PRNDL switch 104 and to the vehicles ignition switch 106. Thus, for example, mirror actuator 102 may be activated to fold the mirror when the ignition switch is off and/or when the vehicle is in PARK. In a similar manner, an internal fold control switch 108 may be provided, for example, on the dashboard of the vehicle may be activated by the operator of the vehicle from within the passenger compartment. In addition, an external fold control switch 110 may be provided on the exterior of the vehicle (shown as being mounted on mirror housing 64 in FIGS. 6 and 7) may be provided to permit the operator to fold or retract the mirror at the operators discretion from the exterior of the vehicle.

Thus, there has been provided a keyless entry system employing a keypad which may be concealed to improve the appearance of the vehicle, prevent unauthorized tampering, and protect the keypad from the elements.

While at least one exemplary embodiment has been presented in the foregoing detailed description of the invention, it should be appreciated that a vast number of variations exist. For example, the keypad itself may be configured to slide or rotate into base 62 or housing 64. The concealable keypad may be associated with a different part or region of the vehicle. For example, the keypad may be configured to be concealable in conjunction with the door handle, door trim, brand emblem, and the like.

It should also be appreciated that the exemplary embodiment is only an example, and is not intended to limit the scope, applicability or configuration of the invention in any way. Rather, the foregoing detailed description will provide those skilled in the art with a convenient road map for implementing an exemplary embodiment of the invention, it being understood that various changes may be made in the function and arrangement of elements described in the exemplary embodiment without departing from the scope of the invention as set forth in the appended claims.

What is claimed is:

1. A keyless entry system for a vehicle, the system comprising:
a processor on-board the vehicle for receiving an access code and comparing the access code with a stored code; and
a mirror assembly, comprising:
a base fixedly coupled to an external surface of said vehicle;
a selectively concealable keypad coupled to said processor and accessible from the exterior of the vehicle through which said access code is manually entered, said keypad positioned on said base; and
a mirror compartment coupled to said base and rotatable between a folded position wherein said mirror compartment does not conceal said keypad and an operational position wherein said mirror compartment conceals said keypad.

2. The system according to claim 1, wherein said mirror assembly is a power sideview/rearview mirror.

3. The system according to claim 2 wherein the vehicle includes a PRNDL switch coupled to said mirror assembly for folding said mirror when the vehicle is in PARK.

4. The system according to claim 2 wherein the vehicle includes an ignition switch coupled to said mirror assembly for folding said mirror when the vehicle's ignition is off.

5. The system according to claim 2 further comprising an exterior control for folding said mirror.

6. The system according to claim 5 wherein said exterior control is positioned on said mirror assembly.

7. The system according to claim 2 further comprising an interior control within the vehicle for folding the mirror.

8. The system according to claim 2 wherein said external surface is an exterior surface of the vehicle's door.

9. A keypad assembly for a vehicle, the assembly comprising:
a mirror assembly mounted on an exterior surface of the vehicle, the mirror assembly comprising:
a base fixedly coupled said exterior surface; and
a mirror compartment rotatably coupled to said base and rotatable between an extended, operational position and a folded, retracted position; and
a keypad mounted on said base, the keypad being visible and accessible in said folded retracted position and said keypad being hidden in said extended, operational position.

10. A keypad assembly according to claim 9 wherein said mirror assembly is a power sideview/rearview mirror.

11. The system according to claim 9 wherein the vehicle includes a PRNDL switch coupled to said mirror assembly for folding said mirror when the vehicle is in PARK.

12. The system according to claim 9 wherein the vehicle includes an ignition switch coupled to said mirror assembly for folding said mirror when the vehicle's ignition is off.

13. The system according to claim 9 further comprising an exterior control for folding said mirror.

14. The system according to claim 13 wherein said exterior control is positioned on said mirror assembly.

15. The system according to claim 9 further comprising an interior control within the vehicle for folding the mirror.

16. The system according to claim 9 wherein said external surface is an exterior surface of the vehicle's door.

17. A keyless entry system for a vehicle, the system comprising:
an on-board processor for receiving an access code and comparing the access code to a stored code;
a selectively concealable keypad coupled to said processor and accessible from the exterior of the vehicle through which said access code is manually entered; and
a mirror assembly mounted on an exterior surface of the vehicle, the mirror assembly comprising:
a base fixedly coupled to said exterior surface; and
a mirror compartment rotatably coupled to said base and rotatable between an operational position and a retracted position, said keypad being mounted on said base so as to be hidden and inaccessible when said mirror compartment is in said operational position, and visible and accessible when said mirror compartment is in said retracted position.

18. A keyless entry system according to claim 17 wherein said mirror assembly is a power-folding sideview/rearview mirror.

19. A keyless entry system according to claim 18 wherein said mirror assembly further comprises an actuator for rotating said mirror compartment to said retracted position when said vehicle is in a predetermined mode of operation.

20. A keyless entry system according to claim 18 further comprising a switch on said mirror compartment for causing said mirror compartment to rotate.

* * * * *